F. J. TROLL.
CUSHIONING MEANS FOR VEHICLES.
APPLICATION FILED JUNE 8, 1916.
1,329,683.
Patented Feb. 3, 1920.
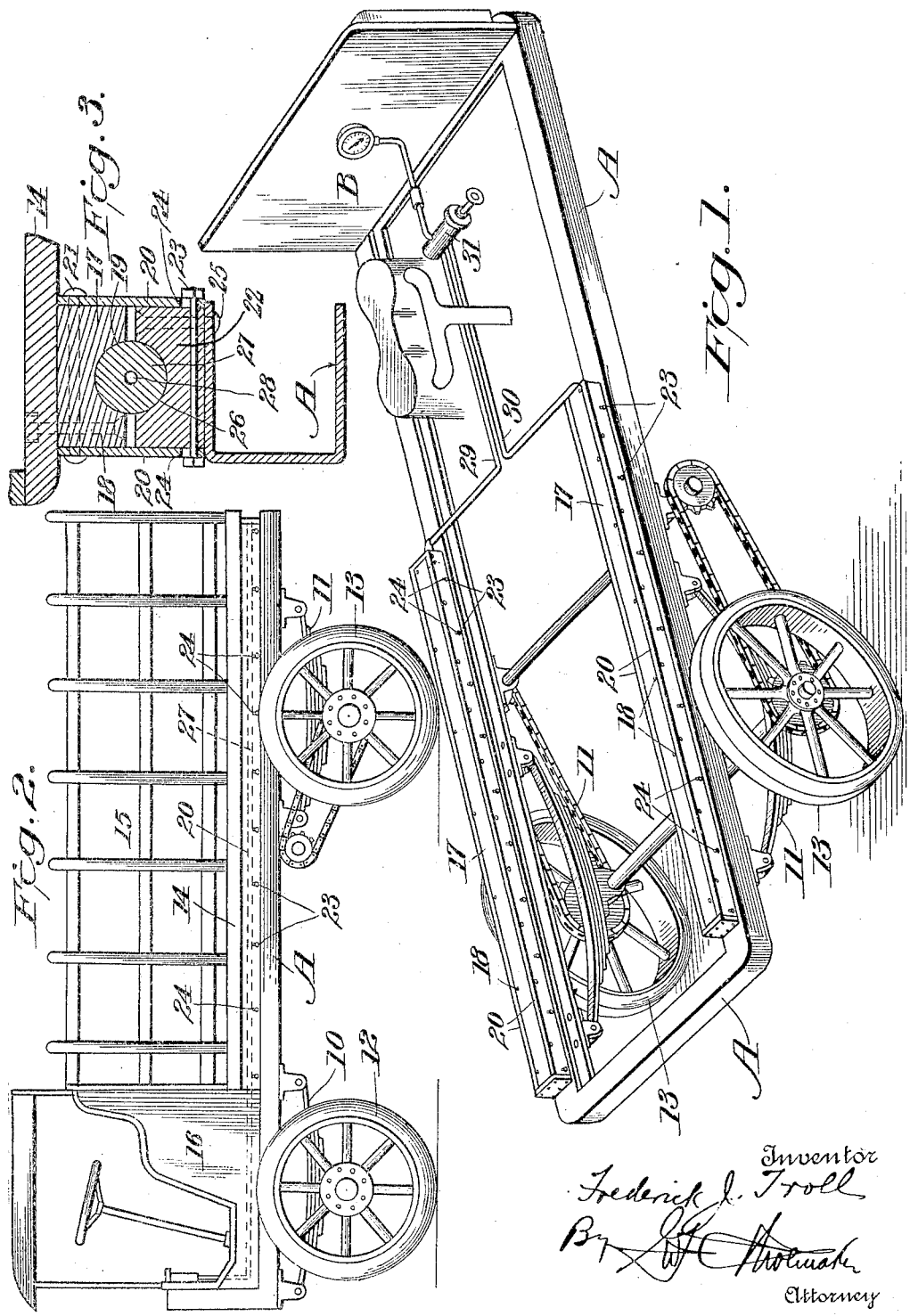
Inventor
Frederick J. Troll
By
Attorney

UNITED STATES PATENT OFFICE.

FREDERICK J. TROLL, OF BALTIMORE, MARYLAND, ASSIGNOR TO THE LOADOMETER COMPANY, OF BALTIMORE, MARYLAND.

CUSHIONING MEANS FOR VEHICLES.

1,329,683.   Specification of Letters Patent.   Patented Feb. 3, 1920.

Original application filed December 14, 1914, Serial No. 877,226. Divided and this application filed June 8, 1916. Serial No. 102,472.

*To all whom it may concern:*

Be it known that I, FREDERICK J. TROLL, a citizen of the United States, residing at the city of Baltimore, State of Maryland, have invented certain new and useful Improvements in Cushioning Means for Vehicles, of which the following is a specification.

This invention relates to vehicles, particularly to motor driven vehicles.

One object is to provide means between the supporting frame and the body of the vehicle to reduce the amount of vibration and shocks to the metal parts of the chassis which latter in time are subject to crystallization.

Another object resides in the provision of a motor driven or other vehicle, embodying among other characteristics, fluid containing means disposed between the body and its supporting means to support the body in normal position on its supporting means irrespective of withdrawal of the fluid or a leak of the fluid from the fluid containing means.

A still further object resides in the provision of a vehicle including a chassis having suitable springs and a body with a fluid containing compressible operating member arranged between the body and the chassis having walls formed of a thickness to support the body in normal position on the chassis in the absence of fluid therein whether the fluid be removed or in the event of a leak in said member.

It is still further designed to provide a cushioning means between the body and chassis of the vehicle, including a fluid containing member compressible to varying degrees according to loads placed on the body and also capable of supporting the body in normal position under the same varying degrees of conpression, as aforesaid, in the absence of fluid in said member.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:—

Figure 1 is a perspective view of a portion of the truck, illustrating my invention applied thereto.

Fig. 2 is a side elevation.

Fig. 3 is a fragmentary transverse vertical sectional view through one side of the truck.

Referring now more particularly to the accompanying drawings, the reference character A indicates the frame of the chassis of a motor truck or other vehicle which is yieldably supported by suitable front and rear springs 10 and 11 on the front and rear wheels 12 and 13 in the usual or any suitable manner.

The character 14 indicates the platform or bottom of the body 15 which usually extends from the rear of the driver's seat 16 to the rear of the frame A. Secured adjacent opposite side edges of the under side of the bottom of the truck are oppositely disposed upper sills 17. Any suitable securing means may be employed for this purpose, but bolts 18 are effective for the purpose. These sills 17 preferably extend from the rear of the driver's seat to the rear end of the truck. In each sill there is formed a substantially semi-circular or other form of longitudinal groove 19 extending throughout the length of each sill.

Plates 20 are secured by means of bolts or other suitable elements 21 to the sides of each sill 17 and depend below the respective sills. The plates 20 are thus arranged in pairs, a pair being secured to each sill. A lower sill 22 is fitted between each pair of plates 20 and each lower sill is preferably the same length as the corresponding upper sill 17. The lower sills are supported for vertical movement between the corresponding pairs of plates 20 by means of bolts or other suitable elements 23 which pass transversely therethrough, and which have movement at their ends in vertical slots 24 formed at the lower edges of the plates 20.

The lower sills 22 are secured by means of bolts or other suitable elements 25 to the chassis A so that the movements of the chassis A incident to uneven riding or jolting of the truck or other vehicle provides for a corresponding up and down movement of the sills 22.

The upper face of each lower sill 22 is provided with a longitudinal recess 26 extending throughout the length thereof and preferably of the same formation as the longitudinal recess 19 in the respective upper sills 17, and preferably disposed in vertical alinement with the latter. In the seats thus formed in the upper and lower sills 17 and 22 on each side of the vehicle I dispose rubber or other compressible, yieldable or resilient fluid containing members 27 which may extend throughout the length of the respective sills. These resilient members 27 each has a relatively small bore 28 which renders the same hollow without rendering the material thin between the bore and the circumference.

Caps, plugs or other suitable elements may be employed to effectively close the outer ends of the compressible elements 27 in order to prevent escape of fluid which these compressible members are adapted to contain in the use of my invention for load indicating purposes in the manner suggested in my co-pending application filed December 14, 1914, Serial No. 877,226, of which this application is a division.

As in my co-pending application, referred to, the inner ends of the compressible members 27 may be closed by being connected up with an indicating device B through the instrumentality of suitable pipe connections 29 and 30 connected by a fluid capacity regulating device 31, so that air, liquid or other fluid in the compressible members and in said connections between the compressible members and the indicating means may effect an operation of the indicating means upon deflection or compression of the compressible members incident to loading or unloading the vehicle. However, as the claims in this case are confined to the shock absorbing characteristics of the present invention, only so much of the structure illustrated in said co-pending application is disclosed as will enable one skilled in the art to understand the present invention. Thus, both ends of the compressible elements are closed and they are inclosed and thereby protected from the weather by a casing consisting of said sills and said plates.

It will thus be understood that there is interposed between the chassis A and the bottom of the vehicle body a fluid containing operating member, which, by virtue of its construction and arrangement serves for one purpose to operate means to indicate underloading and overloading. Another and the main purpose of the present invention, as defined in the appended claims, is the provision of a fluid containing compressible member having a relatively small bore therein and arranged between the chassis A and the bottom of the vehicle body to absorb shocks in the event of the vehicle striking obstructions or when running over uneven road surfaces, said member performing this latter function with or without fluid therein. The compressible member has walls formed of a thickness to support the body in normal position with relation to the chassis in the absence of the fluid, whether the fluid be intentionally withdrawn from the said member or in the event of leakage in said member.

The compressible element is subject to compression incident to loads being placed on the vehicle and also by virtue of shocks due to vibration when the vehicle is driven over uneven road surfaces. The bore in the compressible element is so small in diameter that the element itself is substantially solid and thick, as shown. It is because of the peculiar form of the compressible element that the varying compressions thereof are the same with and without fluid therein.

What I claim is:

1. The combination with a vehicle body and a chassis, of a pair of relatively long sills interposed between the body and the chassis, the opposite faces of the sills having recesses therein throughout the lengths of the sills, and a fluid containing compressible member of a length substantially the length of the sills arranged within the recesses of the sills and having walls constructed to support the body on the chassis, the compressible member walls being formed to support the body without total collapse of the compressible member when the fluid chamber of the compressible member is open.

2. The combination with a wheeled vehicle including a chassis and a body, of pairs of sills interposed between the body and the chassis, one pair at each side of the vehicle body, the opposing faces of each pair of sills having recesses therein, and a fluid containing compressible member arranged within the recesses of each pair of sills, the sills and the compressible members being of substantially the same length.

3. The combination of a vehicle body and a chassis, a pair of sills interposed between the chassis and the body, the sills being arranged longitudinally of the chassis and body, yieldable means arranged between the sills, and plates secured to opposite sides of the sills to overlap the spaces between the sills and shield the yieldable means within the sills.

4. The combination with a vehicle body and a chassis, and a pair of sills interposed between the body and the chassis, the opposite faces of the sills having recesses therein, of a fluid containing compressible member arranged within the recesses of the sills and having walls constructed to support the body in normal position on the chassis without total collapse of the compressible member when the fluid chamber is open.

5. The combination with a vehicle body and a chassis, and a pair of sills interposed between the body and the chassis, the opposite faces of the sills having recesses therein, of a fluid containing compressible member arranged within the recesses of the sills and having walls constructed to support the body in normal position on the chassis without total collapse of the compressible member when the fluid chamber is open.

6. The combination of a vehicle body and a chassis, coöperating pairs of sills interposed between the chassis and the body, each pair of sills being arranged longitudinally of the chassis and the body, yieldable means arranged between each pair of sills, the sills of each pair being spaced from each other and each pair of sills having coöperating recesses to receive said yieldable means, and plates secured to each pair of sills to overlap the spaces between them and shield the yieldable means within the sills.

7. The combination of a vehicle body and a chassis, coöperating pairs of sills interposed between the chassis and the body, yieldable means arranged between each pair of sills, and plates coöperating with the sills to overlap the spaces between the sills of each pair and to inclose the yieldable means.

8. The combination with a wheeled vehicle having a chassis and a vehicle body, a pair of sills mounted between the chassis and the body, and a fluid containing compressible member arranged between the pair of sills, said member having walls of a thickness to support the body in normal position on the chassis without total collapse of the compressible member when the fluid chamber is open.

9. The combination of a vehicle body and a chassis, a pair of sills interposed between the chassis and body, a fluid containing, compressible member arranged between the body and the chassis, and plates coöperating with the sills to overlap the spaces between the sills and to inclose the yieldable means.

10. The combination with a vehicle body and a chassis, of a compressible member arranged between the body and the chassis and provided with an internal fluid containing chamber, the fluid containing compressible member being compressible to varying degrees according to loads placed on the body, and means having connection with the compressible body and communicating with said chamber to receive fluid displaced from said chamber under compression, said member having its walls constructed of a thickness to support the load under the same varying degrees of compression as aforesaid without total collapse of the compressible member owing to the fluid chamber having communication with the aforesaid means into which latter the fluid may flow upon compression of the compressible member.

11. The combination of a vehicle body and a chassis, a pair of sills interposed between the chassis and the body, yieldable means arranged between the sills, and plates coöperating with the sills to overlap the spaces between the sills and to inclose the yieldable means.

In testimony whereof I affix my signature.

FREDERICK J. TROLL.